3,548,427
ALKYL CARBAMATE/ISOPROPYL CARBAMATE FORMALDEHYDE RESIN COMPOSITIONS AND THE MODIFICATION OF FABRICS THEREWITH
Sidney Cohen, Hillsdale, N.J., and Morton Schlesinger, New York, N.Y., assignors to Millmaster Onyx Corporation, New York, N.Y., a corporation of New York
No Drawing. Continuation-in-part of application Ser. No. 595,573, Nov. 21, 1966. This application Mar. 1, 1967, Ser. No. 619,575
The portion of the term of the patent subsequent to July 8, 1986, has been disclaimed
Int. Cl. D06m *13/40, 9/00;* C08d *51/24*
U.S. Cl. 8—115.6                                    16 Claims

ABSTRACT OF THE DISCLOSURE

In order to increase both the appearance and the durability of cellulosic fabrics after repeated launderings, the fabrics are treated with a composition containing, as the active ingredient, a mixture of a first resin consisting of isopropyl carbamate formaldehyde resin and a second resin which may be either lower alkyl, lower alkoxy or lower hydroxyalkyl carbamate formaldehyde resin, wherein the proportion of the first resin to the second resin is between about 15:85 and about 40:60 parts by weight. This resin mixture is applied to the fabric in an aqueous composition, preferably with a catalyst and, if desired, with additional components serving as lubricating agents, wetting agents, and agents to provide better "hand."

---

This invention relates to a method and composition for treating cloth fabric in order to provide both satisfactory "wash-wear" properties (ability to maintain their good appearance despite repeated launderings) and satisfactory "durability" properties (ability to withstand abrasion, stretch, strain, etc., during use).

This is a continuation-in-part of applicants' co-pending application Ser. No. 595,573, filed Nov. 21, 1966, now U.S. Pat. No. 3,454,423.

A large proportion of laundering is today done in the home, where the housewife has neither the professional skill nor the materials to provide the well-finished appearance that is obtainable in good professional laundries. It is, therefore, important to manufacture the fabric in such a manner as to provide a built-in good appearance regardless of the laundering conditions. However, this result has heretofore been obtainable only by the sacrifice of the durability qualities of the fabric. It is, therefore, the primary object of the present invention to overcome this difficulty by making it possible to obtain both satisfactory "wash-wear" properties and satisfactory durability by a simple and relatively inexpensive treatment of the fabric. It is preferable, in this respect, to obtain these results at so-called "low cure cycles."

In accordance with the present invention, both satisfactory "wash-wear" and "durability" properties are provided by treating the fabric with an aqueous composition containing a mixture of a first resin consisting of isopropyl carbamate formaldehyde resin and a second resin which may be either lower alkyl, lower alkoxy or lower hydroxyalkyl carbamate formaldehyde resin, wherein the proportion of the first resin to the second resin is between about 15:85 and about 40:60 parts by weight. Preferably, the proportions should be between about 23:77 and about 33:67 parts by weight. Within the broad range, these two types of resins have been found to act synergistically, whereas, either above or below such range, the "wash-wear" and/or "durability" qualities are not satisfactory. In addition, fabrics treated in accordance with the present invention also have high resistance to "acid souring" and chlorine retention.

This invention is applicable to most of the various types of fabrics now in general use, both natural and synthetic. It is, however, particularly well adapted to cotton and polyester-cotton materials.

The following examples serve to illustrate the invention, but are not intended to limit the scope thereof except as claimed:

EXAMPLE 1

| Components: | Parts by wt. |
|---|---|
| n-Propyl carbamate formaldehyde resin (reaction product of 1 mol n-propyl carbamate with 2.5 mols formaldehyde at a pH of 10 to 11, consisting of a mixture of dimethylol n-propyl carbamate and monomethylol n-propyl carbamate) | 20.0 |
| Isopropyl carbamate formaldehyde resin (reaction product of 1 mol isopropyl carbamate with 2.5 mols formaldehyde at a pH of 10 to 11, consisting of a mixture of dimethylol isopropyl carbamate and monomethylol isopropyl carbamate) | 10.0 |
| Magnesium chloride (30% aqueous solution) | 7.2 |
| "Polasan PEL" (a nonionic polyethylene emulsion containing 40% low-density polyethylene—Onyx Chemical Company) | 2.0 |
| "Karamul 142ST" (a reactive acrylic emulsion containing 45% solids—Refined Products Company) | 2.5 |
| "Neutronyx 600" (a nonionic wetting agent of the polyethoxy-nonylphenol type—Onyx Chemical Company) | 0.2 |
| Water to make 100 parts. | |

Of the above components, the magnesium chloride serves as a catalyst, the "Polasan PEL" as a lubricant, the "Karamul 142ST" to give better "hand," and the "Neutronyx 600" as a wetting agent.

These components were mixed at room temperature and pressure to form the treating composition.

EXAMPLE 2

| Components: | Parts by wt. |
|---|---|
| n-Propyl carbamate formaldehyde resin (as in Ex. 1) | 25.0 |
| Isopropyl carbamate formaldehyde resin (as in Ex. 1) | 10.0 |
| Magnesium chloride (30% aqueous solution) | 8.4 |
| Water to make 100 parts. | |

The components were mixed at room temperature and pressure to form the composition.

EXAMPLE 3

| Components: | Parts by wt. |
|---|---|
| n-Propyl carbamate formaldehyde resin (as in Ex. 1) | 30.0 |
| Isopropyl carbamate formaldehyde resin (as in Ex. 1) | 10.0 |
| Magnesium chloride (30% aqueous solution) | 9.6 |

"Polasan PEL" _____ 2.0
"Karamul 142ST" _____ 2.5
"Neutronyx 600" _____ 0.2
Water to make 100 parts.

The above were mixed at room temperature and pressure to form the composition.

EXAMPLE 4

Components: Parts by wt.
Methyl carbamate formaldehyde resin (reaction product of 1 mol methyl carbamate with 2.5 mols formaldehyde at a pH of 10 to 11, consisting of a mixture of dimethylol methyl carbamate and monomethylol methyl carbamate) __ 20.0
Isopropyl carbamate formaldehyde resin (as in Ex. 1) _____ 10.0
Magnesium chloride (30% aqueous solution) ___ 7.2
"Polasan PEL" _____ 2.0
"Karamul 142ST" _____ 2.5
"Neutronyx 600" _____ 0.2
Water to make 100 parts.

These components were mixed at room temperature and pressure to form the composition.

EXAMPLE 5

Components: Parts by wt.
Hydroxyethyl carbamate formaldehyde resin (reaction product of 1 mol hydroxyethyl carbamate with 2.5 mols formaldehyde at a pH of 10 to 11, consisting of a mixture of dimethylol hydroxyethyl carbamate and monomethylol hydroxyethyl carbamate) _____ 20.0
Isopropyl carbamate formaldehyde resin (as in Ex. 1) _____ 10.0
Magnesium chloride (30% aqueous solution) ___ 7.2
"Polasan PEL" _____ 2.0
"Karamul 142ST" _____ 2.5
"Neutronyx 600" _____ 0.2
Water to make 100 parts.

These components were mixed at room temperature and pressure to form the composition.

EXAMPLE 6

Components: Parts by wt.
Methoxyethyl carbamate formaldehyde resin (reaction product of 1 mol methoxyethyl carbamate with 2.5 mols formaldehyde at a pH of 10 to 11, consisting of a mixture of dimethylol methoxyethyl carbamate and monomethylol methoxyethyl carbamate) _____ 23.0
Isopropyl carbamate formaldehyde resin (as in Ex. 1) _____ 7.0
Magnesium chloride (30% aqueous solution) ___ 7.2
"Polasan PEL" _____ 2.0
"Karamul 142ST" _____ 2.5
"Neutronyx 600" _____ 0.2
Water to make 100 parts.

These components were mixed at room temperature and pressure to form the composition.

EXAMPLE 7

Components: Parts by wt.
Ethyl carbamate resin (reaction product of 1 mol ethyl carbamate with 2.5 mols formaldehyde at a pH of 10 to 11, consisting of a mixture of dimethylol ethyl carbamate and monomethylol ethyl carbamate) _____ 23.0
Isopropyl carbamate formaldehyde resin (as in Ex. 1) _____ 7.0
Magnesium chloride (30% aqueous solution) ___ 7.2
"Polasan PEL" _____ 2.0
"Karamul 142ST" _____ 2.5
"Neutronyx 600" _____ 0.2
Water to make 100 parts.

These components were mixed at room temperature and pressure to form the composition.

EXAMPLE 8

The same components and procedure was used as in Example 1 except that the proportions of n-propyl resin and isopropyl resin were respectively 30.0 and 5.5 parts by weight.

Although magnesium chloride is used in the above examples as the catalyst, any other feasible catalyst may be substituted.

In order to compare compositions containing the various carbamate formaldehyde resins in the aforementioned proportions with similar compositions utilizing different proportions, a number of such other compositions were also prepared. Since most of the above examples contain additional components for lubrication, hand, etc., the compositions used for the comparative tests were also prepared with such additional components in order to make the tests as accurate as possible.

These other compositions, prepared in the same manner as Examples 1 and 3 to 8, are respectively designated A, B, C, D, E, F, G and H, and are listed in the following Table 1, in accordance with the components thereof and the proportions of such components. In each case, water is added to make 100 parts by weight.

TABLE I

| Components | A | B | C | D | E | F | G | H |
|---|---|---|---|---|---|---|---|---|
| n-Propyl carb. resin (as in Ex. 1) | 30.0 | | 10.0 | 10.0 | | | | |
| Methyl carb. resin (as in Ex. 4) | | | | | 30.0 | | | |
| Hydroxyethyl carb. resin (as in Ex. 5) | | | | | | 30.0 | | |
| Methoxyethyl carb. resin (as in Ex. 6) | | | | | | | 30.0 | |
| Ethyl carb. resin (as in Ex. 7) | | | | | | | | 30.0 |
| Isopropyl carb. resin (as in all Exs.) | | 30.0 | 20.0 | 30.0 | | | | |
| Magnesium chloride (30% aqueous solution) | 7.2 | 7.2 | 7.2 | 9.6 | 7.2 | 7.2 | 7.2 | 7.2 |
| "Polasan PEL" | 2.0 | 2.0 | 2.0 | 2.0 | 2.0 | 2.0 | 2.0 | 2.0 |
| "Karamul 142ST" | 2.5 | 2.5 | 2.5 | 2.5 | 2.5 | 2.5 | 2.5 | 2.5 |
| "Neutronyx 600" | 0.2 | 0.2 | 0.2 | 0.2 | 0.2 | 0.2 | 0.2 | 0.2 |

Each of the compositions, respectively, designated Ex. 1, Ex. 3, Ex. 4, Ex. 5, Ex. 6, Ex. 7, Ex. 8, A, B, C, D, E, F, G and H were applied in the same manner to a cotton broadcloth shirting material by padding individual pieces of the cloth wtih the respective aqueous solutions shown in Examples 1, 3, 4, 5, 6, 7 and 8, and in Table 1. The wet pick-up in each case was approximately 70% by weight. The cloths were then pinned on frames, dried for 1 minute at 275° F. in a circulating air oven, and then cured for 1½ minutes at 300° F.

The cloths treated ith the compositions of Examples 1, 3, 4, 5, 6, 7 and 8, and those treated with the compositions designated A, B, C, D, E, F, G and H, were tested for "wash-wear" rating in accordance with the standard "AATCC Tentative Test Method 88A–1964T," and for durability under abrasion, stress and strain in accordance with the "Stoll Flex Abrasion Test Method (CCCT191b, 5300)." The results are listed in the following Table 2:

TABLE 2

Percent of total carbamate resins

| Components | n-Propyl | Methyl | Hydroxy-ethyl | Methoxy-ethyl | Ethyl | Isopropyl | Flex abrasion warp cycle | Wash-wear rating |
|---|---|---|---|---|---|---|---|---|
| A | 100 | | | | | | 280 | 5.0 |
| B | | | | | | 100 | 1,048 | 4.5 |
| Example 1 | 67 | | | | | 33 | 1,040 | 4.8 |
| C | 33 | | | | | 67 | 1,040 | 4.0 |
| Example 3 | 75 | | | | | 25 | 692 | 4.8 |
| D | 25 | | | | | 75 | 1,179 | 4.0 |
| Example 4 | | | 67 | | | 33 | 980 | 4.8 |
| E | | | 100 | | | | 310 | 5.0 |
| Example 5 | | | | 67 | | 33 | 1,056 | 4.8 |
| F | | | | 100 | | | 246 | 5.0 |
| Example 6 | | | | | 77 | 23 | 868 | 4.7 |
| G | | | | | 100 | | 332 | 4.9 |
| Example 7 | | | | | 77 | 23 | 850 | 4.8 |
| H | | | | | 100 | | 285 | 4.9 |
| Example 8 | | 85 | | | | 15 | 610 | 4.9 |

A "wash-wear" rating, in order to be satisfactory, must be greater than 4.5, while a "flex-abrasion" value, to be satisfactory, must be greater than 600. As is clear from Table 2, the only treated fabrics that were satisfactory in both respects were those of Examples 1, 3, 4, 5, 6, 7 and 8.

It should be noted from Table 2 that the results did not follow any foreseeable course when different proportions of the same components were used. This is to be seen in the fact that when different proportions of the same components were used, namely, the n-propyl and isopropyl resin, the "flex-abrasion" ratings obtained were not directly proportional to the relative amounts of these components. Therefore, calculating from the values obtained in formulations A and B, Example 1 would be expected to give a "flex-abrasion" rating of 538, but actually gave a rating of 1040. Similarly, Example 3 would be expected to give a "flex-abrasion" rating of 472, but actually gave a rating of 692.

Although the above compositions basically constitute the present invention, it has been found that the "wash-wear" ratings are even further boosted by the addition of about 3 to 10 parts by weight of other thermosetting resins such as dimethylol derivatives of triazones, ethylene urea, melamine, propylene urea, and the like.

Obviously, many modifications of the present invention are possible in the light of the above teachings. It is, therefore, to be understood that within the scope of the appended claims, the invention may be practiced otherwise than as specifically described.

The invention claimed is:

1. A method of treating fabric which comprises coating the fabric with an aqueous composition consisting essentially of a first resin and a second resin, the first resin being isopropyl carbamate formaldehyde resin, and the second resin being a member of the group consisting of lower alkyl carbamate formaldehyde resin, lower alkoxy carbamate formaldehyde resin and lower hydroxyalkyl carbamate formaldehydre resin, the proportion of the first to the second resin being in the ratio of between about 15:85 and about 40:60 parts by weight, drying the treated fabric and then curing the treated fabric.

2. The method of claim 1, wherein the drying is effected for about 1 minute at about 275° F., and the curing is effected for about 1½ minutes at about 300° F.

3. The method of claim 1, wherein the aqueous composition also includes an effective amount of a catalyst.

4. The method of claim 1, wherein the aqueous composition also includes about 3 to 10 parts by weight of an additional thermosetting resin.

5. The method of claim 1, wherein said ratio is between about 23:77 and 33:67.

6. The method of claim 1, wherein the aqueous composition also includes effective amounts of a catalyst, a lubricant, a wetting agent and an agent for increasing the hand of the fabric.

7. A composition for treating fabric consisting essentially of water, isopropyl carbamate formaldehyde resin and a second resin selected from the group consisting of lower alkyl carbamate formaldehyde resin, lower alkoxy carbamate formaldehyde resin and lower hydroxyalkyl carbamate formaldehyde resin, the proportion of the isopropyl carbamate formaldehyde resin to the second resin being in the ratio of between about 15:85 and about 40:60 parts by weight.

8. The composition of claim 7 including an effective amount of a catalyst.

9. The composition of claim 7, including effective amounts of a catalyst, a lubricant, a wetting agent, and an agent for increasing the hand of the fabric.

10. The composition of claim 7, including about 3 to 10 parts by weight of an additional thermosetting resin.

11. The composition of claim 7 wherein said ratio is between about 23:77 and 33:67.

12. A fabric selected from the group consisting of cellulosic fibers and blends of cellulosic and synthetic fibers, wherein the fabric is impregnated with an aqueous composition consisting essentially of isopropyl carbamate formaldehyde resin and a second resin selected from the group consisting of lower alkyl carbamate formaldehyde resin, lower alkoxy carbamate formaldehyde resin and lower hydroxyalkyl carbamate formaldehyde resin, the proportion of the isopropyl carbamate formaldehyde resin to the second resin being in the ratio of between about 15:85 and about 40:60 parts by weight.

13. The fabric of claim 12, wherein the impregnated fabric has been heat cured.

14. The fabric of claim 12, wherein the impregnant contains effective amounts of a lubricant, a wetting agent and an agent for increasing the hand of the fabric.

15. The fabric of claim 12, wherein the impregnant contains about 3 to 10 parts by weight of an additional thermosetting resin.

16. The fabric of claim 12, wherein said ratio is between about 23:77 and 33:67.

References Cited

UNITED STATES PATENTS

| 3,454,423 | 7/1969 | Cohen et al. | 8—116.3X |
| 3,450,485 | 7/1969 | Reinhardt et al. | 8—116.3 |
| 3,416,880 | 12/1968 | Kullman et al. | 8—116.3 |
| 3,144,299 | 8/1964 | Frick et al. | 8—116.3 |

GEORGE F. LESMES, Primary Examiner

J. CANNON, Assistant Examiner

U.S. Cl. X.R.

8—115.7, 115.5, 116.3; 117—138.8, 139.4, 143, 161; 252—8.8; 260—29.4, 849